United States Patent
Vindas et al.

(10) Patent No.: US 10,983,049 B2
(45) Date of Patent: Apr. 20, 2021

(54) METHOD FOR DETECTING A LOCAL CHANGE IN REFRACTIVE INDEX OF A DIELECTRIC MEDIUM LOCATED ON THE SURFACE OF AN OPTICAL SENSOR

(71) Applicant: COMMISSARIAT A L'ENERGIE ATOMIQUE ET AUX ENERGIES ALTERNATIVES, Paris (FR)

(72) Inventors: Karim Vindas, Grenoble (FR); Elodie Engel, Grenoble (FR); Loic Leroy, Grenoble (FR); Thierry Livache, Jarry (FR); Arnaud Buhot, Saint Etienne de Crossey (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/897,362

(22) Filed: Feb. 15, 2018

(65) Prior Publication Data
US 2018/0231462 A1    Aug. 16, 2018

(30) Foreign Application Priority Data
Feb. 15, 2017   (FR) ...................................... 1751242

(51) Int. Cl.
*G01N 21/45* (2006.01)
*G01N 21/552* (2014.01)
(Continued)

(52) U.S. Cl.
CPC ........... *G01N 21/45* (2013.01); *G01N 21/431* (2013.01); *G01N 21/554* (2013.01);
(Continued)

(58) Field of Classification Search
CPC .......... G01M 11/0242; G01M 11/0257; G01N 21/256; G06B 11/25
See application file for complete search history.

(56) References Cited

U.S. PATENT DOCUMENTS 5,641,956 A * 6/1997 Vengsarkar ........ G02B 6/02095
250/227.14
5,815,278 A * 9/1998 Johnston .............. G01N 21/553
356/445

(Continued)

FOREIGN PATENT DOCUMENTS

DE              3327668 A1 * 7/1985 ............ G01M 11/00

OTHER PUBLICATIONS

N. Cennamo et al., "Modal Filtering for Optimized Surface Plasmon Resonance Sensing in Multimode Plastic Optical Fibers," in IEEE Sensors Journal, vol. 15, No. 11, pp. 6306-6312, Nov. 2015.doi: 10.1109/JSEN.2015.2450991 (Year: 2015).*

(Continued)

*Primary Examiner* — Rebecca C Bryant
(74) *Attorney, Agent, or Firm* — Clark & Brody LP

(57) ABSTRACT

The invention relates to a method for detecting a local change in refractive index of a dielectric medium located on the surface of an optical sensor, said optical sensor comprising for this purpose a waveguide comprising a region, called the active region, covered with at least one metallic layer in contact with the dielectric medium, said method comprising the following steps:

a) emitting a light beam at the input of the waveguide so that this light beam can be propagated, within the waveguide, according to at least N propagation modes, where N is a natural integer such that N≥2;

b) measuring the intensity of at least one zone of the spatial distribution of the intensity of the light beam reflected by said active region of the optical sensor; and (Continued)

c) detecting the local change in the refractive index of the dielectric medium by means of a database supplying the link between the intensity of said at least one zone of the spatial distribution of the intensity of the light beam reflected by the active region of the optical sensor and a change in refractive index of a reference medium.

11 Claims, 6 Drawing Sheets

(51) Int. Cl.
  *G01N 21/77* (2006.01)
  *G01N 21/43* (2006.01)
(52) U.S. Cl.
  CPC ..... *G01N 21/7703* (2013.01); *G01N 21/7746* (2013.01); *G01N 2021/432* (2013.01); *G01N 2021/434* (2013.01); *G01N 2021/458* (2013.01); *G01N 2021/772* (2013.01)

(56) References Cited

U.S. PATENT DOCUMENTS

| | | | | |
|---|---|---|---|---|
| 7,460,238 | B2* | 12/2008 | Skorobogatiy | B82Y 20/00 356/445 |
| 9,201,000 | B2* | 12/2015 | Kiesel | G01N 21/645 |
| 2012/0120401 | A1* | 5/2012 | Valsesia | G01N 21/554 356/445 |
| 2014/0218738 | A1* | 8/2014 | Bartoli | G01N 21/45 356/450 |

OTHER PUBLICATIONS

Chigusa et al., "Properties of . . . its application", Optoelectronics, vol. 1, No. 2, pp. 203-216, Dec. 1986.
Deiss et al., "Opto-electrochemical nanosensor . . . DNA detection", The Royal Society of Chemistry, 2011, 136, 327-331.
Kurihara et al., "Fiber-optic conical . . . single-mode fiber", Analytica Chimica Acta 523 (2004) 165-170.
Cao et al., "Wavelength-based localized . . . fiber biosensor", Sensors and Actuators B 181 (2013) 611-619.
Chen et al., "Effects of Incident . . . Surface Plasmon Resonance", Plasmonics (2017) 12:707-715.
Fan et al., "Sensitive optical . . . targets: A review", Analytica Chimica Acta 620 (2008) 8-26.
Kawachi, "Silica waveguides . . . integrated-optic components", Optical and Quantum Electronics 22 (1990) 391-416.
Kim et al., "Integrated photonic . . . in polymers", Optics Communications 281 (2008) 4644-4647.
Liu et al., "Highly Sensitive . . . Fiber Sensor", IEEE Sensors Journal, vol. 16, No. 5, Mar. 1, 2016.
Loterie et al., "Digital confocal . . . multimode fiber", Optics Express, vol. 23, No. 18, 2015.
Luchansky et al., "High-Q Optical . . . Biological Analysis", Analytical Chemistry, 2012, 84, 793-821.
Kreysing et al., "Dynamic operation of . . . of biological cells", Nature Communications, 2014.
Nicholson et al., "Spatially and spectrally . . . large-mode-area fibers", Optics Express, vol. 16, No. 10, May 12, 2008.
Do et al., "A rapid method . . . purification of proteins", Protein Expression and Purification 60 (2008) 147-150.

* cited by examiner

Indice 1,336      Indice 1,423

METHOD FOR DETECTING A LOCAL CHANGE IN REFRACTIVE INDEX OF A DIELECTRIC MEDIUM LOCATED ON THE SURFACE OF AN OPTICAL SENSOR

The invention relates to a method for detecting a local change in refractive index of a dielectric medium located on the surface of an optical sensor.

In particular, said detection may consist of determining the value of said local change in the refractive index of the dielectric medium.

The optical sensor generally comprises a waveguide comprising a region covered with at least one metallic or dielectric layer, called the active region, in contact with the dielectric medium.

For example, when said layer is metallic, the optical sensor then forms a plasmon effect sensor.

A plasmon effect sensor is familiar to a person skilled in the art.

Generally, the waveguide is then an optical fibre, a part of which, namely the active region, does not have cladding and the core of this active region is covered with the metallic layer intended to be in contact with a dielectric medium. The dielectric medium may be liquid or gaseous. The sensor thus formed is combined with an optical source, emitting over a given wavelength range and able to operate in reflection or in transmission. The interaction between certain propagation modes of the light beam and the metallic layer makes it possible to generate a plasmon resonance at the interface between the metallic layer and the dielectric medium.

In practice, this translates into a decrease in the luminous intensity reflected or transmitted by the active region, which can be measured. This type of sensor is used for example as a biosensor. In fact, when specific probes (e.g. antibodies) directed against an analyte, also specific, are grafted on the active region, recognition of this analyte by the dedicated probe will cause a local change in refractive index of the dielectric medium in which the analyte is located, near the interface between the metallic layer and the dielectric medium. This local change in refractive index shifts the position of the peak of plasmon resonance, thus altering the intensity of the light that is reflected or transmitted.

Thus, by measuring this change in intensity, we are able to detect the adsorption of the analyte by the probe.

According to another example, when said layer is dielectric, the optical sensor can then form an interferometric sensor.

A great many configurations of waveguides, and more specifically of optical fibres to form a plasmon effect sensor or other sensor have already been proposed.

A recurrent aim of these configurations is notably to be able to propose a sensitive optical sensor, whether it functions in reflection or in transmission.

Reference may be made for example to the article by K. Kurihara et al., "*Fiber-optical conical microsensors for surface plasmon resonance using chemical etched single-mode fiber*", Analytica Chimica Acta, Vol. 523 (2), pp. 165-170 (2004) (D1).

In the known approaches, it is therefore generally a particular design of waveguide that is proposed.

The invention aims to propose a different approach.

To achieve this aim, the invention proposes a method for detecting a local change in refractive index of a dielectric medium located on the surface of an optical sensor, said optical sensor comprising for this purpose either a waveguide comprising a region, called the active region, covered with at least one metallic layer and/or dielectric in contact with the dielectric medium, or a waveguide facing another waveguide, said other waveguide forming a resonator and constituting a region, called the active region, in contact with the dielectric medium, said method comprising the following steps:

a) emitting a light beam at the input of the waveguide so that this light beam can be propagated, within the waveguide, according to at least N propagation modes, where N is a natural integer such that N≥2;
b) measuring the intensity of at least one zone of the spatial distribution of the intensity of the light beam reflected or transmitted by said active region of the optical sensor; and
c) detecting the local change in the refractive index of the dielectric medium by means of a database supplying the link between the intensity of said at least one zone of the spatial distribution of the intensity of the light beam reflected or transmitted by the active region of the optical sensor and a change in refractive index relative to a reference medium.

The method according to the invention will also be able to perform the following steps, taken alone or in combination:

- step c) consists of determining the value of the local change in the refractive index of the dielectric medium;
- a step is carried out, consisting of determining the value of the refractive index of the reference medium, and then, after determining the value of the local change in the refractive index of the dielectric medium during step c), determining the value of the refractive index of the dielectric medium;
- between step a) and step b), an additional step is carried out, consisting of filtering at most N−1 propagation modes, said filtering being carried out on the mode or modes that are the least likely to be modified by the active region or that have not been modified by the active region;
- said additional step is carried out upstream, with reference to the direction of travel of the light beam in the waveguide, of the active region of the optical sensor to provide filtering on the mode or modes that are the least likely to be modified by the active region;
- said additional step is carried out by means of a "darkfield" objective, namely an objective having an opaque disc at its centre;
- said additional step is carried out downstream, with reference to the direction of travel of the light beam in the waveguide, of the active region of the optical sensor to provide filtering at least on the mode or modes that have not been modified by the active region;
- the waveguide is an optical fibre;
- said method being carried out in reflection, the active region of the optical sensor, which is therefore the active region of the optical fibre, is of a truncated cone shape with a mirror located at its end;
- the intensity measured, during step b), on said at least one zone of the spatial distribution and the intensity taken into account, during step c), in the database on said at least one zone of the spatial distribution are each an average intensity over said zone under consideration;
- the intensity measured, during step b), on said at least one zone of the spatial distribution and the intensity taken into account, during step c), in the database on said at least one zone of the spatial distribution is a combination of the coefficients of the decomposition of this intensity in a base made up of the different propagation modes;

the active region of the optical sensor comprises one or more metallic layer(s), so that said optical sensor constitutes a plasmon effect sensor;

the active region of the optical sensor consists of one or more dielectric layer(s), so that said optical sensor constitutes an interferometric sensor.

Other features, aims and advantages of the invention will become clearer on reading the description, which refers to the appended figures given as examples, in which.

In a first embodiment of the invention, the method according to the invention is a method for detecting a local change in refractive index of a dielectric medium located on the surface of a plasmon effect sensor (optical sensor), the plasmon effect sensor comprising for this purpose a waveguide comprising a region, called the active region, covered with at least one metallic layer in contact with the dielectric medium, said method comprising the following steps:

emitting a light beam at the input of the waveguide so that this light beam can be propagated, within the waveguide, according to at least N propagation modes, where N is a natural integer such that N≥2;

measuring the intensity of at least one zone of the spatial distribution of the intensity of the light beam reflected by said active region of the plasmon effect sensor; and detecting the local change in the refractive index of the dielectric medium by means of a database supplying the link between the intensity of said at least one zone of the spatial distribution of the intensity of the light beam reflected by the active region of the plasmon effect sensor and a change in refractive index relative to a reference medium.

When the index of the reference medium is known, determination of the value of the local change in the refractive index of the dielectric medium then gives the value of the refractive index of the dielectric medium.

Figure 1:
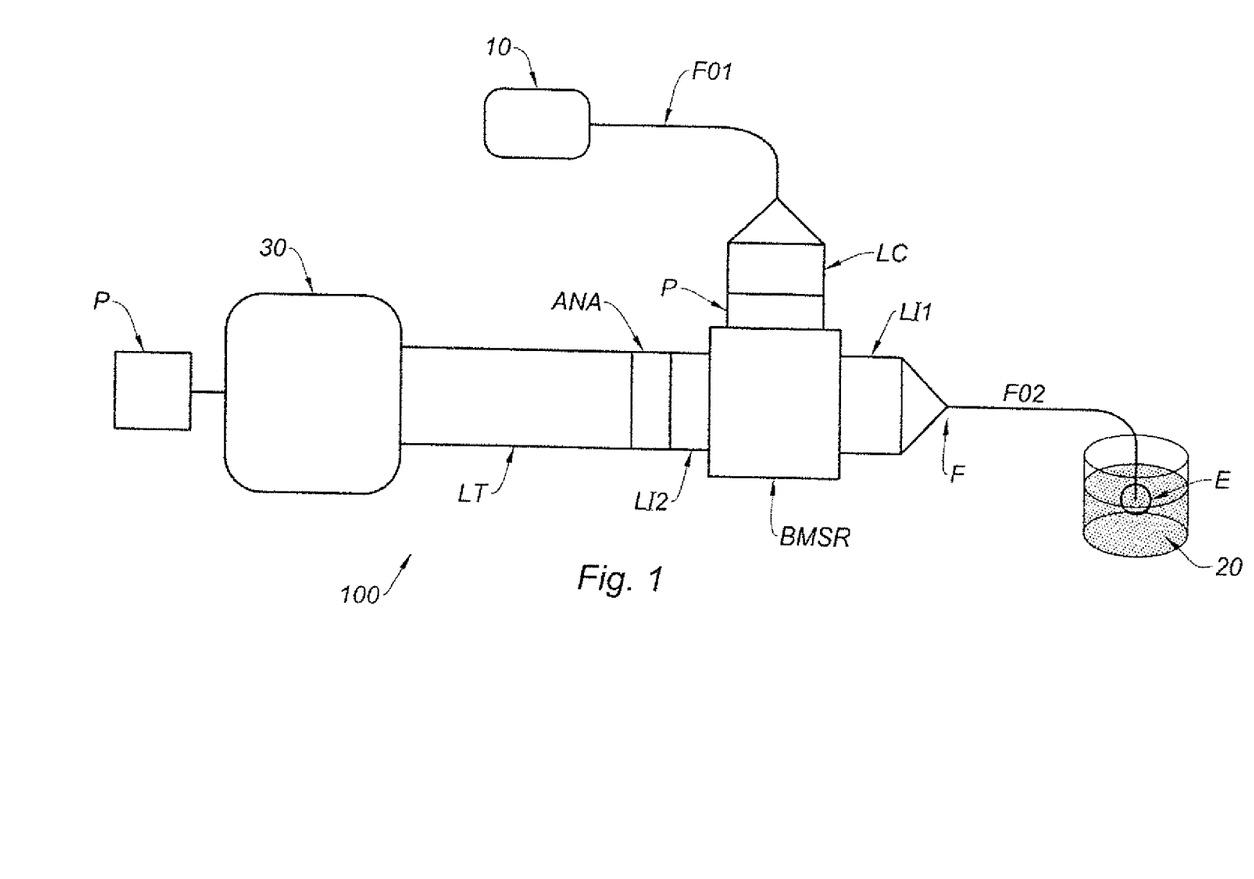
FIG. 1 is a schematic diagram of a set-up for implementing the invention, with operation in reflection.

FIG. 1 shows a schematic diagram of an experimental set-up 100 for implementing the method according to the invention.

In this particular case, the experimental set-up 100 operates in reflection.

This experimental set-up 100 comprises an optical source 10 capable of emitting a light beam, in this case of a given wavelength λ, in an optical fibre FO1 (waveguide, used as a source of illumination), a set of means for conditioning the light beam in the direction of another optical fibre FO2 (waveguide), which is the fibre of interest of the set-up, the end E of which is immersed in a solution 20 comprising a dielectric medium, in this case liquid, as well as a means 30 for measuring, on at least one zone of the other end F of the optical fibre FO2, the spatial distribution of the intensity of the light reflected by the end E, said end E of the optical fibre FO2 constituting the active region of this optical fibre.

It is therefore understood that the emitted light beam propagates within the waveguide towards the active region. This active region reflects the light beam and the light beam, reflected in this way, has a spatial distribution of intensity. It is this spatial distribution of intensity that is measured, on at least one zone of the end F of the optical fibre FO2.

The set of means for conditioning the light beam in the direction of the optical fibre FO2 is conventional. More precisely, this set comprises a collimating lens LC, a polarizer P, a semi-reflecting mirror block SRMB, an imaging lens LI1 (at the exit of which there is the end F of the optical fibre FO2), all located on the optical path between the optical source 10 and the end E of the optical fibre FO2.

Figure 2:
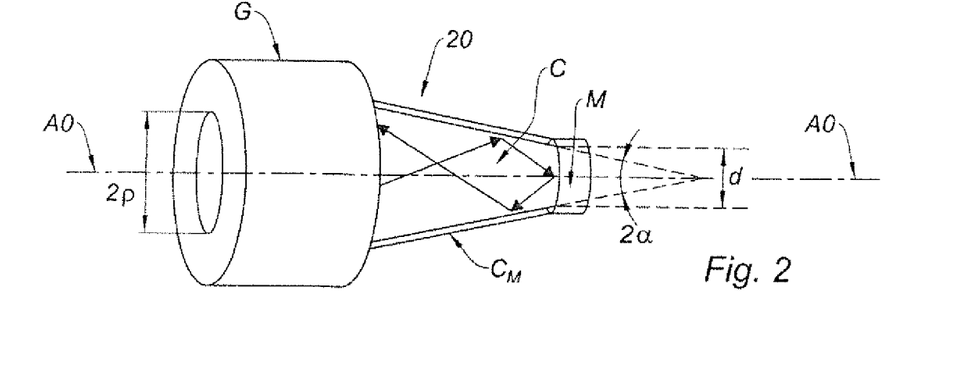
FIG. 2 is an enlarged view of an active region of the plasmon effect sensor used in the set-up in FIG. 1.

The ends E and F of the optical fibre FO2 are shown schematically in FIG. 2. In FIG. 2, we note the presence of the cladding G, the core C without cladding, and the metallic layer CM. We also note the presence of the solution 20 forming the dielectric medium.

At the level of the active region of the sensor, the mirror M, as well as the metallic layer CM, are intended to reflect the incident light beam. It is at the level of the metallic layer CM that the phenomenon of surface plasmon resonance may occur.

For its part, the reflected light beam is intended to return along the optical fibre FO2 to the semi-reflecting mirror block SRMB, from which it is guided in the direction of the means 30. Another set of means for conditioning the reflected light beam is arranged between the mirror block SRMB and the means 30. This other conditioning set comprises, conventionally, another imaging lens LI2, an analyser ANA and a tube lens LT.

It should be noted that in the particular case when the waveguide is an optical fibre (core+cladding), the number of modes that can be propagated in the optical fibre depends on:

the radius ρ of the core of the optical fibre (FO2);

the numerical aperture (NA); and the wavelength λ of the light beam emitted by the optical source 10.

The numerical aperture NA can be expressed in the form:

$$NA = \sqrt{n_G^2 - n_C^2}$$

where:

$n_C$ is the refractive index of the core C; and $n_G$ is the refractive index of the cladding G.

The number of propagation modes propagating in an optical fibre can be determined by referring to sections 36-12 and 36-13 of the manual "*Optical Waveguide Theory*", Allan W. Snyder and John D. Love, Chapman and Hall Ltd. (2012), first published in 1983 by Chapman and Hall Ltd., ISBN 0 412 09950 0 (cased), ISBN 0 412 24250 8 (Science Paperback).

In this particular case, the optical fibre FO2 was selected according to the characteristics defined in Chigusa et al., "*Properties of silica glass image fiber and its application*", Optoelectronics Devices and Technologies, 1(2), pp. 203-216 (1986), supplied by the company Fibers and Technology, cf. http://www.fibersandtechnology.com.

The optical fibre FO2 is such that it has:

a core radius of about ρ≈1.5 µm, a numerical aperture NA=0.4

Moreover, the tests conducted with this experimental set-up 10 were carried out with an optical source 10 emitting a light beam:

of wavelength λ=590 nm.

Depending on the exact radius of the core (variations connected with manufacture), the optical fibre FO1, FO2 supports 2 to 4 propagation modes.

The end E of the optical fibre FO2, forming the active region of the plasmon effect sensor, is in this case in the form of a truncated cone. At the level of the mirror M, the diameter d of the optical fibre FO2 is about 1.2 µm, therefore roughly corresponding to the diameter of the mirror M. The semi-angle α, defined relative to the optical axis OA of the optical fibre FO2, at the apex of the truncated cone is about 5° (2α is shown in FIG. 2).

This truncated shape is not necessary for carrying out the invention.

However, a truncated shape makes it possible to limit considerably the numerous reflections that otherwise occur at the end E of the optical fibre FO2 and that cause losses that may prevent the light returning in the opposite direction.

This truncated cone was made according to the teachings supplied in F. Deiss et al., "Nanostructured optical fibre arrays for high-density biochemical sensing and remote imaging", Analytical and Bioanalytical Chemistry, 396(1), pp. 53-71 (2010).

Then the cladding-free core of the optical fibre FO2 was covered with the metallic layer CM, in this case a keying layer of titanium (Ti) of about 5 nm and a layer of gold (Au) at a thickness of 50 nm, on its entire lateral surface.

For its part, the mirror M is formed by depositing a layer of gold at the level of the apex of the truncated cone, with a thickness of about 500 nm.

The optical source is a light-emitting diode (LED), in this case the M590F2 offered by the company Thorlabs, therefore emitting at a wavelength of 590 nm.

The fibre FO1 is an SMA Fiber Patch Cable M35L02 fibre, of length 2 m, diameter 1000 microns, 0.39 NA, Low OH.

The means 30 for measuring the reflected luminous intensity is a camera, in this case from the company Hamatsu, model Orca 4.0. It is connected to a processor P providing image analysis.

The imaging lens LI1 is an Olympus X20, with a numerical aperture of 0.4.

Using the experimental set-up 100 as described above, a great many measurements were performed, changing the nature of the solution forming the dielectric medium from one measurement to another, while keeping the other conditions identical. The "dielectric" nature of these solutions is to be taken into account relative to the metallic material (gold, in this case) covering the core of the optical fibre FO2.

In this example, it is a water/glycerol solution, in which the glycerol content is changed from one solution to another to change its optical properties.

Table 1 below presents the properties of the different solutions S1 to S17 tested, for a wavelength λ=590 nm of the optical source 10 and a temperature T=25° C., identical in all the tests.

TABLE 1

| Solution number | Degrees Brix (°Bx) | Refractive index | Local change in refractive index of the solution relative to the reference medium (solution 1) |
|---|---|---|---|
| 1 | 0 | 1.332 (pure water) | 0 |
| 2 | 0.7 | 1.333 | 0.001 |
| 3 | 1.2 | 1.334 | 0.002 |
| 4 | 2.5 | 1.336 | 0.004 |
| 5 | 5.9 | 1.341 | 0.009 |
| 6 | 9.5 | 1.346 | 0.014 |
| 7 | 11.8 | 1.350 | 0.018 |
| 8 | 12.3 | 1.350 | 0.018 |
| 9 | 14.5 | 1.354 | 0.022 |
| 10 | 17.4 | 1.360 | 0.028 |
| 11 | 25.8 | 1.373 | 0.041 |
| 12 | 27.7 | 1.377 | 0.045 |
| 13 | 35.2 | 1.390 | 0.058 |
| 14 | 40.8 | 1.402 | 0.07 |
| 15 | 51.2 | 1.423 | 0.091 |
| 16 | 54.5 | 1.430 | 0.098 |
| 17 | 60.1 | 1.442 | 0.11 |

The influence of the glycerol content is expressed by the Brix degrees of the solution in question, which serves for determining the fraction of sucrose in a liquid.

Figure 3:
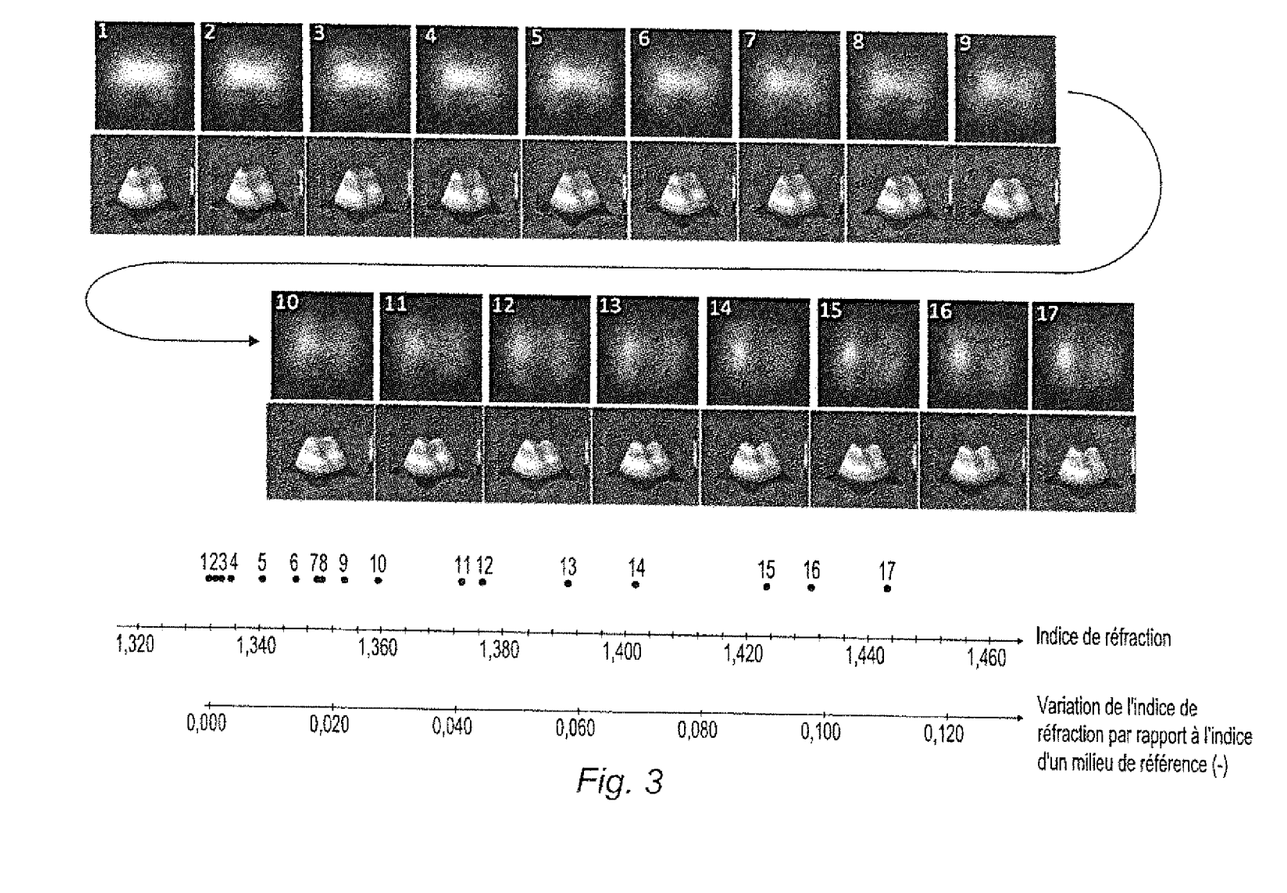
FIG. 3 shows test results obtained with the set-up in FIG. 1.

The images of the end F supplied by the camera are given in FIG. 3.

More precisely, FIG. 3 shows, for each of the solutions 1 to 17, the corresponding image (representative of what happens at the end E of the fibre FO2) that is obtained (at the top). FIG. 3 also shows (at the bottom), the corresponding intensity profile. This intensity profile is obtained using the ImageJ® plug-in software (3D Surface Plot). Using this software, it is easier to obtain quantitative values for performing measurement of the spatial distribution of the intensity of the light beam reflected by the active region of the sensor.

It can be seen that the spatial distribution of the intensity of the reflected light beam is not the same, as a function of the refractive index of the solution.

Figure 4:
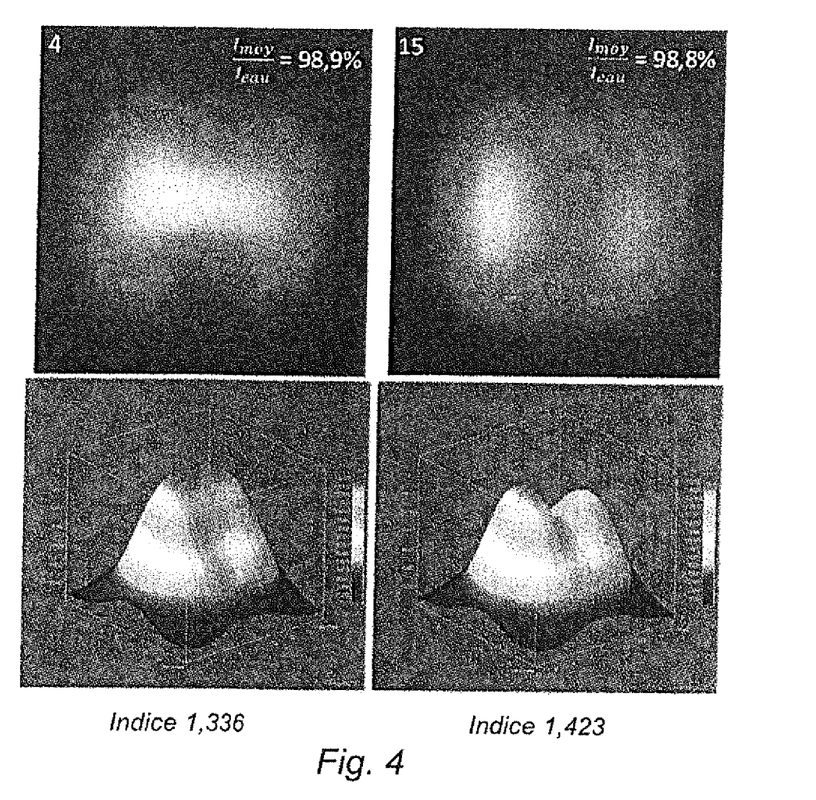
FIG. 4 is an enlarged partial view of FIG. 3.

Images 4 and 15 in FIG. 3 are shown in isolation in FIG. 4.

It is interesting to note that if we measure the total intensity reflected ($I_{total}$), the difference between images 4 and 15 is very slight (compare the two images at the top). In fact, the quantity $I_{total}/I_{water}$, which represents the total reflected intensity normalized for water, is 98.9% in FIG. 4 for a refractive index of 1.336 whereas this same quantity $I_{total}/I_{water}$ is 98.8% for a refractive index of 1.423. It is therefore difficult, in this case, to associate a precise value of the refractive index with an overall measurement of the reflected intensity. This means that the sensitivity of the sensor is relatively low. However, on comparing the spatial distribution of this intensity for FIGS. 4 and 15 (compare the two images at the bottom), very different profiles (i.e. spatial distributions of the reflected intensity) are found.

For even better representation of the advantage of performing a measurement of the spatial distribution of the reflected intensity, measurement of the reflected intensity normalized for water was performed for each of the 17 solutions in Table 1, and for each solution, on three different zones of the spatial distribution of the intensity reflected by the active region of the optical fibre.

Figure 5:
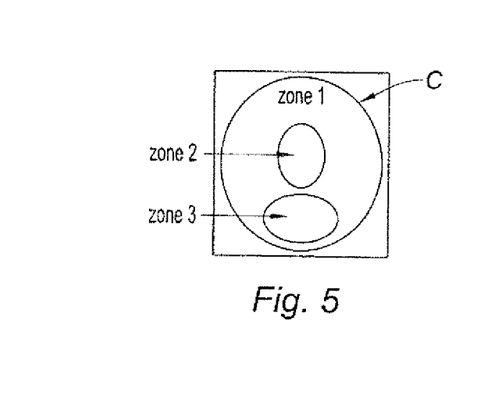
FIG. 5 is an image of the end of the optical fibre, showing several possible measurement zones.

These three zones are shown in FIG. 5.

Zone 1 defines the region corresponding to the whole of the spatial distribution of the reflected intensity leaving the optical fibre. For this region, we therefore have access to an overall (average) measurement, which therefore gives access to the total reflected intensity, normalized for water. It is understood that the reflected overall intensity integrates the entire spatial distribution of intensity. This measure is for reference and is not the object of the invention.

Zone 2 defines a zone of the spatial distribution of intensity localized on the central zone of the fibre core.

Zone 3 defines another zone of the spatial distribution of the reflected intensity localized on a peripheral zone of the fibre core.

It is understood that zone 2 and zone 3, which are localized, only take into account one part of the spatial distribution of intensity, because of the simple fact that zone 2 and zone 3 only form one part of zone 1.

Figure 6:
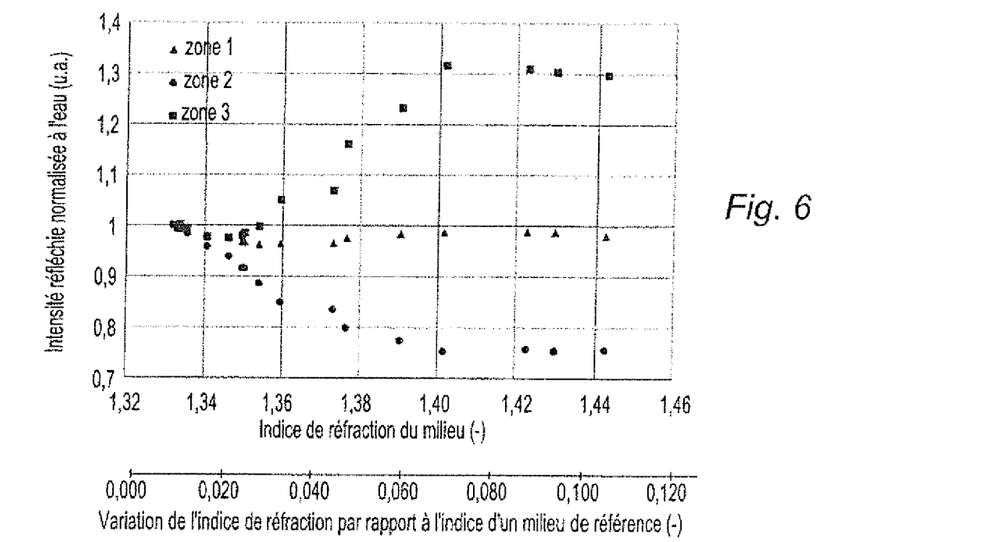
FIG. 6 shows the variation of the intensity reflected by the active region of the plasmon effect sensor used in the set-up in FIG. 1, normalized for water, as a function of a change of refractive index, but also of a refractive index, for each of the measurement zones defined in FIG. 5.

The results obtained are shown in FIG. 6.

It can be seen from FIG. 6 that the variations of reflected intensity are far greater for the localized measurement zones (zone 2, zone 3) than for the overall measurement zone (zone 1).

The sensitivity S of the sensor was determined from the data in FIG. 6.

The sensitivity S is defined by the relation:

$$S = \frac{\Delta I / I_{water}}{\Delta n}$$

where:
$I_{water}$ is the measured reflected intensity, on the same zone under consideration, when the end E of the optical fibre FO2 is immersed in pure water, serving as the reference medium (solution 1);
$\Delta I/I_{water}$ is the change in reflected intensity measured by the sensor, normalized for water (in %, or, as here, in arbitrary units a.u.); and
$\Delta n$ is the local change in refractive index of the dielectric medium (expressed in RIU, for "Refractive Index Unit").

Figure 7:
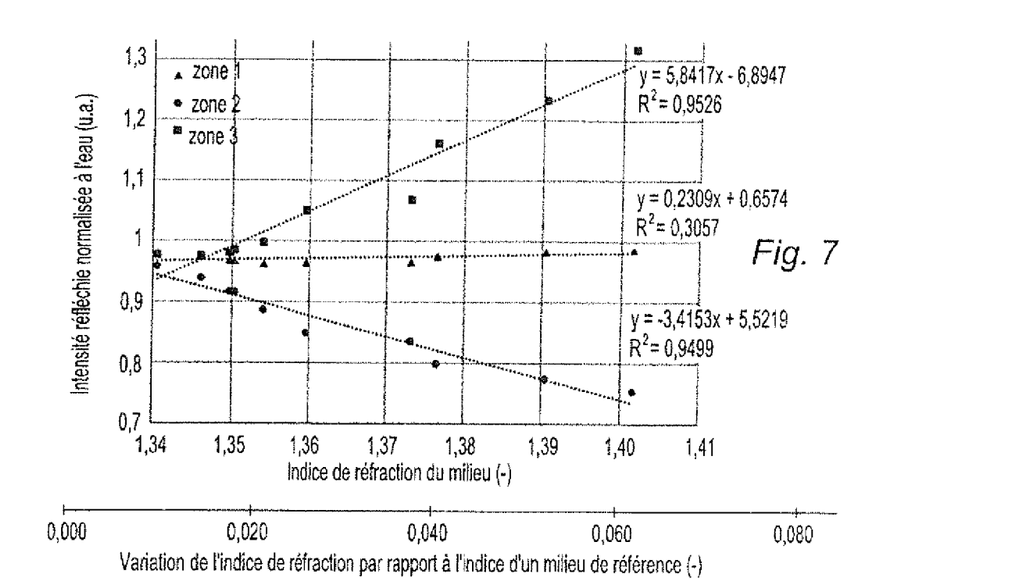
FIG. 7 is an enlarged view, over a certain range of refractive indices, of FIG. 6.

These data are shown in FIG. 7, for values of refractive index of the solution between 1.34 and 1.41 (solutions 5 to 14). Therefore the ordinate shows the quantity $\Delta I/I_{water}$ and the abscissa shows (besides the refractive index), the local change in the refractive index relative to the index of the reference medium (solution 1).

It will be understood that for each of the zones 1, 2 and 3, the quantity $\Delta I$ is determined as a change in the average intensity over the observation zone under consideration.

A sensitivity of 23%/RIU is obtained for zone 1. A sensitivity of −341%/RIU is obtained for zone 2. Finally, a sensitivity of 584%/RIU is obtained for zone 3. In other words, depending on the choice of measurement zone, it is possible to improve the sensitivity of the sensor by a factor of 25 (comparison zone 3/zone 1).

The approach proposed in the context of the invention is not based on a particular design of an optical fibre forming a plasmon effect sensor. Consequently, the improvement in sensitivity is valid for any optical sensor based on a waveguide allowing at least two propagation modes.

In the context of the invention, the applicant in fact realized that on the one hand a change in refractive index had an effect on the spatial distribution of the intensity of the reflected light beam and on the other hand knowledge of this spatial distribution made it possible to increase the sensitivity of the sensor, without any structural modification of the sensor.

To the best of the applicant's knowledge, this has never been found previously.

In particular, in document D1, only a single propagation mode is used, and in fact all that is done is measure the total intensity reflected by the active region of the sensor.

In the context of the invention, and in contrast to the prior art, measurement is of the spatial distribution, on the zone in question of the end F of the optical fibre FO2, of the intensity reflected by the active region E of this same optical fibre.

This makes it possible to show the link between a local change in refractive index of the dielectric medium and a particular form of the spatial distribution of the luminous intensity reflected by the active region.

This also makes it possible to construct a database supplying the link between the intensity of said at least one zone of the spatial distribution of the intensity of the light beam reflected by the active region of the plasmon effect sensor and a change in refractive index relative to the reference medium.

The data in Table 1 are an example of a database usable in the context of the invention for achieving not only detection of a local change in refractive index, but more precisely determination of the value of a local change in refractive index (or even determination of the local index if a reference medium of known refractive index is available).

In use, the local change in refractive index of the dielectric medium is not known a priori. However, it is possible to measure the spatial distribution of the reflected luminous intensity with a set-up according to the experimental set-up 100, and deduce from that, using the database previously constructed, the local change in refractive index of the dielectric medium tested, relative to the reference medium, to deduce the characteristics of this dielectric medium.

Thus, for example, in use, if an intensity profile is obtained according to image 4 (solution 4 in Table 1) in FIG. 3, a change in index of 0.004 relative to the reference medium is deduced from this. In practice, this makes it possible for example to quantify an analyte present in the dielectric medium (e.g. assay of the sugar in a syrup).

According to another example, after specific functionalization of the active region, it is sufficient to detect the local change in refractive index of the dielectric medium induced by biological recognition (e.g. antibody/analyte) for qualifying the presence of the analyte.

However, the refractive index of this dielectric medium can be found if we know the refractive index of a reference medium.

This is the case with the tests that were performed, since a preliminary test (measurement) was carried out with pure water to determine the value of the refractive index of the reference medium. In fact, in use, by adding the local change in the refractive index of the dielectric medium tested (properties initially unknown) to the refractive index of the reference medium, the refractive index of the dielectric medium tested is obtained.

However, it will be clear that knowledge of the refractive index of the reference medium (cf. above tests) is not obligatory, whether for constructing the database or in use, i.e. when we want to determine the change in refractive index of an unknown dielectric medium.

In fact, the variation of the spatial distribution of the intensity reflected by the active region over the zone considered is a characteristic of the local variations in refractive index of the medium tested.

Moreover, it has to be understood that there are various ways of constructing a database usable in the context of the invention.

In the table, it is based on a change in the glycerol content of water (° Brix).

However, a different procedure is possible.

Thus, to construct a database of this kind, it will be possible more generally to generate known changes in refractive index of a dielectric medium, which will be associated with specific spatial distributions of the reflected intensity.

As an example, salt, in place of glycerol, may be added to the water. According to another example, the water-based solution may be heated or cooled, as the refractive index depends on the temperature according to a known relation.

Furthermore, it is not essential to have water as the reference medium.

It may notably be the medium tested, in known conditions (temperature, pressure or pH) or at a given time point, for example when the dielectric medium to be tested is brought into contact with the active region of the optical sensor.

Furthermore, the database may be simplified and as a consequence it does not always give access to a value of a local change in refractive index. In fact, it is entirely conceivable to construct a database of the all-or-nothing type, namely which supplies information of the "detected" or "not detected" type as a function of the intensity of said at least one zone of the spatial distribution of the intensity of the light beam reflected by the active region of the plasmon effect sensor.

Briefly, the database may be constructed in many ways. What is important is to be able to make a necessary and sufficient link between a change in refractive index of the dielectric medium tested, whether or not the value of this change is determined, and a particular distribution of the reflected intensity.

As can be seen from the tests presented above (for example FIG. 3), the spatial distribution of the luminous intensity reflected or transmitted by the active region of the plasmon effect sensor is in the form of a distribution on a flat surface. This is connected with the use of the camera 30. However, this spatial distribution could be observed is some other way, i.e. not on a flat surface, but for example from the solid angle about the optical axis.

Other embodiments are conceivable.

In particular, a method according to the invention may operate entirely in transmission.

Thus, in a second embodiment of the invention, the method according to the invention is a method for detecting a local change in refractive index of a dielectric medium located on the surface of a plasmon effect sensor (optical sensor), said plasmon effect sensor comprising for this purpose a waveguide comprising a region, called the active region, covered with at least one metallic layer in contact with the dielectric medium, said method comprising the following steps:

emitting a light beam at the input of the waveguide so that this light beam can be propagated, within the waveguide, according to at least N propagation modes, where N is a natural integer such that N≥2;

measuring the intensity of at least one zone of the spatial distribution of the intensity of the light beam transmitted by said active region of the plasmon effect sensor; and detecting the local change in the refractive index of the dielectric medium by means of a database supplying the link between the intensity of said at least one zone of the spatial distribution of the intensity of the light beam transmitted by the active region of the plasmon effect sensor and a change in refractive index relative to a reference medium.

Figure 8:
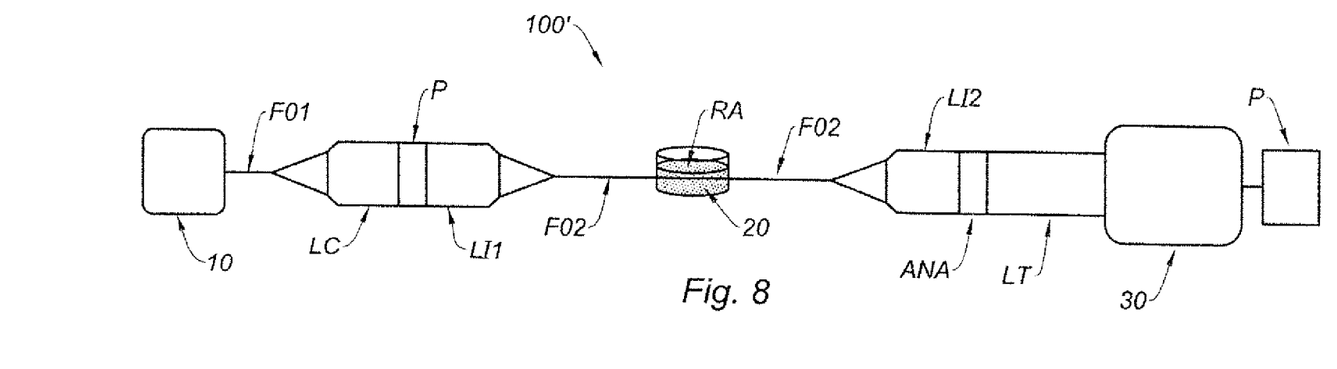
FIG. 8 is a schematic diagram of another set-up for implementing the invention, with operation in transmission.
Figure 9:
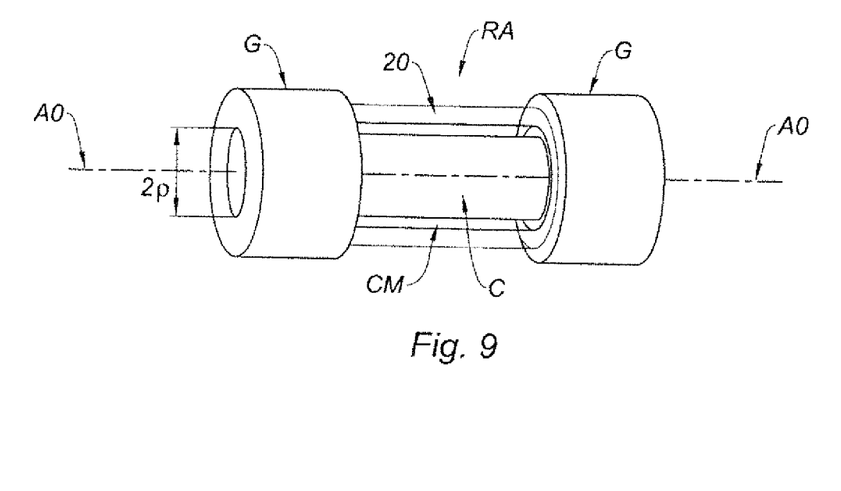
FIG. 9 is an enlarged view of an active region of the plasmon effect sensor in FIG. 8.

A set-up 100' for implementing the method according to this second embodiment is shown schematically in FIG. 8 and an enlarged view of the active region RA is shown in FIG. 9.

FIG. 8 (transmission) is to be compared with FIG. 1 (reflection).

FIG. 9 (transmission) is to be compared with FIG. 2 (reflection).

In FIGS. 8 and 9, the references identical to FIGS. 1 and 2, respectively, denote the same components.

In transmission, there is no longer a semi-reflecting mirror block. Moreover, the active region RA does not form an end of the fibre FO2, but forms a part thereof, and moreover is not truncated. In transmission, it is therefore understood that the emitted light beam propagates within the waveguide towards the active region. This active region transmits the light beam, and light beam transmitted in this way has a spatial distribution of intensity. It is this spatial distribution of intensity that is measured.

Otherwise the description given for the first embodiment, and in particular the design details, are the same.

In the two embodiments described above, the plasmon effect sensor employs at least one metallic layer CM. This metallic layer CM may be a conventional layer (in the bulk). The plasmon effect is then a surface plasmon effect.

However, as a variant it may also be a nanostructured layer, for example a layer formed from metallic nanoparticles, and in particular nanoparticles of gold (Au). The plasmon effect is then a plasmon effect localized on the surface of the nanoparticles. In this case we may then envisage operation in reflection (according to the schematic diagrams in FIG. 1 and FIG. 2 for the truncated case, but the non-truncated case is also conceivable) or operation in transmission (according to FIGS. 8 and 9, for example).

Reference may be made for example to the article "Wavelength-based localized surface plasmon resonance optical fiber biosensor", CAO Jie et al., *Sensors and Actuators B: Chemical*, 2013, Vol. 181, pp. 611-619.

It should be noted that the use of a plasmon effect sensor as an optical sensor, whether operating in reflection or in transmission, is not the only way of achieving the aim of the invention.

In fact, it is possible to use other types of optical sensors.

Thus, an optical sensor of the interferometric type may be used.

In this case, relative to a plasmon effect sensor, it is possible to provide at least one dielectric layer, in place of said at least one metallic layer CM. Advantageously, several dielectric layers will be provided, for greater efficiency.

Thus, in reflection, it will be possible to replace the layer CM in FIG. 2 with at least one dielectric layer to obtain an interferometric sensor. This also applies when the end of the optical fibre or more generally of the waveguide is not truncated.

The schematic diagram in FIG. 1 remains identical in the case when, in reflection, the plasmon effect sensor is replaced with an interferometric sensor.

Moreover, in transmission, it will be possible to replace the layer CM in FIG. 9 with at least one dielectric layer to obtain an interferometric sensor.

The schematic diagram in FIG. 8 remains identical in the case when, in transmission, the plasmon effect sensor is replaced with an interferometric sensor.

Reference may be made for example to the article "*A rapid method for determining dynamic binding capacity of resins for the purification of proteins*", Protein expression and purification, 2008, Vol. 60, 2, pp. 147-150.

In another variant, it is possible to use an optical sensor of the resonator type.

From a structural standpoint, this approach amounts to adding at least one other waveguide GO, for example ring-shaped, in the vicinity of a cladding-free region of the waveguide FO2, in such a way that the surface of this other waveguide GO is in contact with the dielectric medium to be characterized. "Ring-shaped" is to be understood as a shape looped back on itself. In other words, the ring may be of various shapes, notably, as non-limiting examples, in the shape of a circle or an ellipse.

The other waveguide GO is intended to form a resonator. The active region RA of the assembly formed by the waveguide FO2 and the other waveguide GO consists of this other waveguide GO (GO=RA=active region).

From a practical standpoint, such an assembly is not made with optical fibres, but on solid supports for reasons of mechanical stability.

Figure 10:
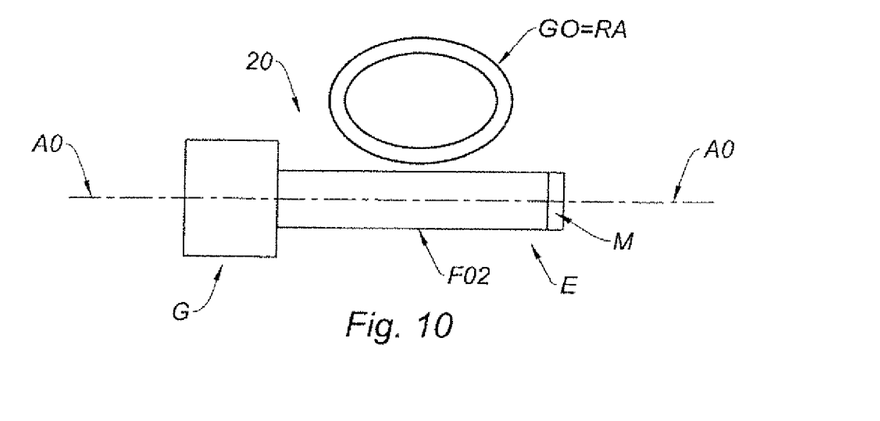
FIG. 10 is a schematic view showing an active region of an optical sensor of the resonator type and its environment, capable of operating in reflection.

This configuration is shown in FIG. 10 in the case of operation in reflection (presence of the mirror). In reflection, the set-up 100 shown in FIG. 1 can be used with the resonator sensor.

Figure 11:
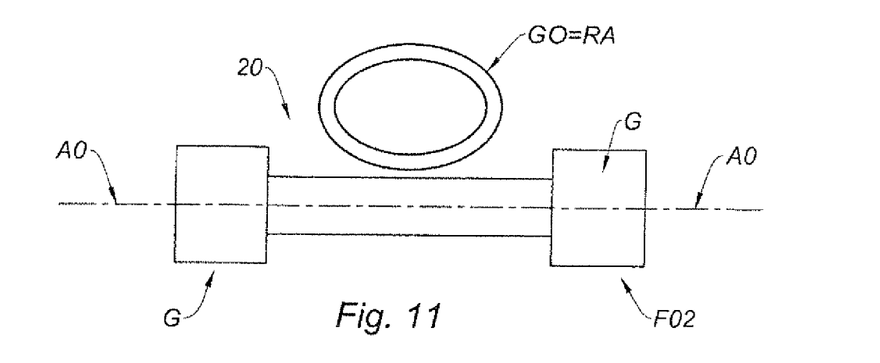
FIG. 11 is a schematic view showing an active region of an optical sensor of the resonator type and its environment, capable of operating in transmission.

This configuration is also shown in FIG. 11 in the case of operation in transmission. In transmission, the set-up 100' shown in FIG. 8 can be used with the resonator sensor.

In operation, under certain conditions, there may be coupling between the waveguides FO2 and GO, which translates, in the first waveguide FO2, into a change in reflected or transmitted luminous intensity.

In other words, the resonator (waveguide GO) in this case performs the function performed by said at least one metallic layer CM of a plasmon effect sensor or the function performed by said at least one dielectric layer.

Reference may be made to the article by Luchansky et al. "High-Q optical sensors for chemical and biological analysis", Analytical chemistry, 2011, Vol. 84 (2), pp. 793-821. Reference may also be made to the article by Kim et al., "*Integrated photonic glucose biosensor using a vertically coupled microring resonator in polymers*", Optics Communications, 2008, Vol. 281 (18), pp. 4644-4647.

Thus, in this embodiment, the invention relates to a method for detecting a local change in refractive index of a dielectric medium located on the surface of an optical sensor, said optical sensor comprising for this purpose a waveguide facing another waveguide, this other waveguide forming a resonator and constituting a region, called the active region, in contact with the dielectric medium, said method comprising the following steps:

emitting a light beam at the input of the waveguide so that said light beam can be propagated, within the waveguide, according to at least N propagation modes, where N is a natural integer such that $N \geq 2$;

measuring the intensity of at least one zone of the spatial distribution of the intensity of the light beam reflected or transmitted by this active region; and detecting the local change in the refractive index of the dielectric medium by means of a database supplying the link between the intensity of said at least one zone of the spatial distribution of the intensity of the light beam reflected or transmitted by the active region of the optical sensor and a change in refractive index relative to a reference medium.

In the tests described above, the number of propagation modes of the light beam is small, in this case between 2 and 4. The applicant considers that the method according to the invention described above, according to the embodiments described above, can be used without difficulty for a small number N of propagation modes, for example for N<10, either with the set-up 100 in FIG. 1 or with the set-up 100' in FIG. 8.

Although not obligatory, for a large number of propagation modes, for example for $N \geq 10$, it may be advantageous to select the propagation modes in the optical fibre that are useful for generating the effect that we want to identify (decrease or increase in intensity reflected or transmitted, regardless of the means of transduction used: plasmon effect, interferometry, etc.). In fact, in certain cases, several propagation modes are confined to the centre of the core of the optical fibre so that the energy of those modes that reach the active region is not sufficient to produce a measurable effect. For example, in the case of a plasmon effect sensor, these modes are simply reflected by the mirror at the end of the fibre or transmitted, without generating a plasmon effect at the level of the active region.

In certain cases, it may then be difficult to detect the different propagation modes correctly.

That is why, in such cases, one solution consists of only retaining the propagation modes that are able to generate a detectable effect. These are the propagation modes that are the most peripheral, i.e. farthest from the centre of the optical fibre, and which therefore have the greatest inclination relative to the optical axis of the optical fibre FO2.

In practice, in the scheme in FIG. 1 or the scheme in FIG. 8, the collimating lens LC can be replaced with a "dark-field" objective. A "dark-field" objective is an objective that has an opaque disc, i.e. one that does not allow the light beam to pass through, at its centre. As a result, the most-central propagation modes are stopped and only the most-peripheral modes are transmitted beyond the "dark-field" objective. Then, when the light beam continues on its path, only the propagation modes that are modifiable by the active region arrive at the level of the active region of the sensor. The active region of the sensor therefore only sees a small number of propagation modes and an analysis of the spatial distribution of the reflected or transmitted intensity can then be performed as described above.

A modification of this kind is inexpensive.

The use of a "dark-field" objective in place of the collimating lens LC is not the only possibility.

Thus, it is possible to use the approach proposed by M. Kreysing et al., "*Dynamic operation of optical fibers beyond the single-mode regime facilitates the orientation of biological cells*", Nature Communications 5, Article Number: 5481 doi/10.1038/ncomms6481. Relative to the set-up in FIG. 1 or in FIG. 8, this amounts to replacing the optical source 10, the associated optical fibre FO1 as well as the collimating lens LC, by the light injection system that is proposed in said article. Once again, the active region of the optical sensor therefore only sees a small number of propagation modes and an analysis of the spatial distribution of the intensity reflected or transmitted by the active region can then be performed as described above.

Whether we employ a "dark-field" objective or adopt the approach proposed by Kreysing et al., after emission of the light beam and before analysis of the spatial distribution of the luminous intensity reflected or transmitted by the active region of the sensor, an additional step is therefore carried out, consisting of filtering at most N−1 propagation modes, said filtering being carried out on the mode or modes that are the least likely to be modified by the active region. This filtering amounts to performing partial or complete attenuation of the mode or modes that are the least likely to be modified by the active region. Finally, after this filtering, there will still be at least two propagation modes that can serve as a basis for carrying out an analysis of the spatial distribution of the luminous intensity reflected or transmitted by the active region of the sensor.

Another solution is to provide, in place of the camera, a means 30 formed by a spectrophotometer. The data supplied by the spectrophotometer are then processed to identify the propagation modes that have been modified by the active region of the sensor. This processing may be based on the method proposed by J. W. Nicholson et al., "*Spatially and spectrally resolved imaging of modal content in large-mode-area fibers*", Optics Express, Vol. 16(10), pp. 7233-7243 (2008).

In this article, the starting point is the principle that the total intensity $I_{total}$ is a linear combination of the intensities $I_i$ of each propagation mode, with $1 \leq i \leq N$, the intensity contribution of each propagation mode being weighted by a real coefficient $\alpha_i$.

We then have the relation $I_{total} = \Sigma_{i=1}^{N} \alpha_i I_i$

The coefficients $\alpha_i$ can be determined by the method proposed by Nicholson.

Applied in the context of the invention, it is a question of determining and comparing the values of the coefficients $\alpha_i$ obtained for different dielectric media. This makes it possible to eliminate the propagation modes that have not been modified by the active region. In fact, whether we are working in reflection or in transmission, the propagation modes that have been modified by the active region (for example that have been subjected to a plasmon effect) are the modes whose coefficient $\alpha_i$ has a larger change relative to the refractive index of the medium. The other propagation modes have in contrast a slight change in their coefficients $\alpha_i$. This also makes it possible to associate, with each dielectric medium, a series of coefficients that are characteristic of the indices of these dielectric media. Determination of these coefficients $\alpha_i$ then amounts to performing an analysis of the spatial distribution of the reflected or transmitted intensity.

Thus, the intensity measured in step b) on said at least one zone of the spatial distribution and the intensity taken into account, during step c), in the database on said at least one zone of the spatial distribution is in this case a combination of the coefficients of the decomposition of this intensity in a base made up of the different propagation modes.

In contrast to the solutions based on what is proposed in Kreysing et al., filtering is carried out downstream of the active region of the sensor. In other words, in this case, the additional step is carried out downstream, with reference to the direction of travel of the light beam in the waveguide forming an optical sensor, of the active region of the sensor to provide filtering at least on the mode or modes that have not interacted with the active region.

Nevertheless, the aim is the same, namely to be able to find the spatial distribution of the luminous intensity reflected or transmitted in good conditions.

Yet another possibility is to produce, at the level of the light source and during step a), wavefronts of the light sent into the optical fibre, which are structured to induce preferential excitations on particular zones or sub-regions, more precisely on at least two different zones or sub-regions, of the end E (active region) of the optical fibre.

The principle for obtaining such excitation of the end E of the optical fibre FO2 is described by Loterie et al., "*Digital confocal microscopy through a multimode fiber*", Optics Express, 2015, Vol. 23 (18), pp. 23845-23858.

It should be noted that this approach applies in reflection (FIG. 1) and in transmission (FIG. 8) only for a plasmon effect or interferometric optical sensor. The case of operation with a sensor of the resonator type is excluded.

In fact, the idea is in this case to illuminate specifically, and preferably successively, at least two separate zones of the end E, forming the active region, of the optical fibre FO2 of interest.

This approach may be employed quite particularly with an optical fibre carrying a large number of modes, for example N>10. In fact, in this case, at least two more-illuminated zones on the end E of the optical fibre FO2 can be identified more easily, because several propagation modes contribute to illuminating these zones more than others on the end E of the optical fibre FO2.

In practice, this approach may allow spatial information to be obtained concerning the localization of molecules or particles (viruses, bacteria, cells, etc.), at the scale of the end of the optical fibre. This approach may also make it possible, if the end E of the optical fibre has been functionalized differently beforehand (for example antibody A and antibody B) at the level of said zones, to qualify the presence of a particular analyte.

The invention is applicable to any waveguide that can form an optical sensor. Just as for the particular case of the optical fibre, the number of modes that can be propagated in a waveguide can be defined from its geometry, the numerical aperture and the wavelength of the light beam.

An example of a waveguide that is not an optical fibre but that could be used in the context of the invention is a substrate on silicon. An example of such a substrate is proposed by M. Kawachi, "*Silica waveguides on silicon and their application to integrated-optic components*", Optical and Quantum Electronics, col. 22(5), pp. 391-416 (1990). With a waveguide of this kind, a further advantage is that it is then additionally possible to produce an integrated optical component.

It will also be noted that the invention is applicable for any dielectric medium M, liquid or gaseous, notably in biosensors and chemical sensors.

It can therefore be used when the sensor is an electronic tongue (dielectric medium=liquid) or of an electronic nose (dielectric medium=gas).

Finally, it is worth noting that the invention may also be applied to any assembly of several waveguides arranged side-by-side, i.e. in parallel to one another. An optical multi-sensor can thereby be formed. As with the specific case of optical fibre assemblies (multicore fibres . . . ), the invention is, in this context, of increased interest. Indeed, this configuration of optical multi-sensors is particularly relevant in the field of bio-sensors given that wavelength analyses are highly complex to implement. Intensity analyses are often the only option available. The gain in sensitivity enabled by the invention can therefore be simply exploited.

In this case (multi-sensors), the optical sensor either comprises several waveguides arranged in parallel (cf. FIGS. 1, 2, 8 and 9 with several waveguides placed in parallel), each one having a region, known as the active region, covered with at least one metallic and/or dielectric layer in contact with the dielectric medium, or comprises several waveguides arranged in parallel (FIGS. 10 and 11, with several waveguides placed in parallel), and each one facing another waveguide, each of which being called another waveguide forming a resonator and constituting a region, called the active region, in contact with the dielectric medium, said steps a), b) and c) being implemented for each of said waveguides.

The invention claimed is:

1. A method for detecting a local change in refractive index of a dielectric medium located on the surface of an optical sensor, said optical sensor comprising either a waveguide comprising a region, called the active region, covered with at least one metallic and/or dielectric layer in contact with the dielectric medium, or a waveguide facing another waveguide, this other waveguide forming a resonator and constituting a region, called the active region, in contact with the dielectric medium, said method comprising the following steps:
  a) emitting a light beam at the input of the waveguide so that the light beam can be propagated, within the waveguide, according to at least N propagation modes, where N is a natural integer such that N≥2, towards the active region, the light beam reflected or transmitted by the active region, thus presenting a given spatial distribution of an intensity;
  b) measuring a local intensity from at least one zone of the given spatial distribution of the intensity of the light beam reflected or transmitted by said active region of the optical sensor, the local intensity only taking into account the intensity of one part of said given spatial distribution; and
  c) detecting the local change in the refractive index of the dielectric medium by means of a database supplying a link between the local intensity of said at least one zone of the given spatial distribution of the intensity of the light beam reflected or transmitted by the active region of the optical sensor and a change in refractive index relative to a reference medium.

2. The method according to claim 1, in which the detection carried out in step c) comprises determining the value of the local change in the refractive index of the dielectric medium.

3. The method according to claim 1, in which a step is carded out that comprises determining the value of the refractive index of the reference medium and then, after determining the value of the local change in the refractive index of the dielectric medium during step c), determining the value of the refractive index of the dielectric medium.

4. The method according to claim 1, in which, between steps a) and b), an additional step is carried out, the additional step comprising filtering at most N−1 propagation modes upstream, with reference to a direction of travel of the light beam on the waveguide, the filtering by means of a dark-field objective having an opaque disc at a center thereof.

5. The method according to claim 1, in which the waveguide is an optical fiber.

6. The method according to claim 5, in which, with the method carried out in reflection, the active region of the optical sensor, which is therefore the active region of the optical fiber, is of a truncated cone shape with a mirror located at its end.

7. The method according to claim 1, in which the local intensity measured, during step b), on said at least one zone of the given spatial distribution and the intensity taken into account, during step c), in the database on said at least one zone of the given spatial distribution are each an average intensity over said zone under consideration.

8. The method according to claim 1, in which the local intensity I measured, during step b), on said at least one zone of the given spatial distribution and the intensity taken into account, during step c), in the database on said at least one zone of the given spatial distribution is expressed as a linear combination of the intensities $I_i$ of each propagation mode weighted by a real coefficient ai, with 1≤I≤N, namely $I=\Sigma_{i=1}^{N}\alpha_i I_i$.

9. The method according to claim 1, in which the active region of the optical sensor comprises one or more metallic layer(s), so that said optical sensor constitutes a plasmon effect sensor.

10. The method according to claim 1, in which the active region of the optical sensor consists of one or more dielectric layer(s), so that said optical sensor constitutes an interferometric sensor.

11. The method according to claim 1, wherein the optical sensor either comprises several waveguides arranged in parallel, each one comprising a region, called the active region, covered with at least one metallic and/or dielectric layer in contact with the dielectric medium, or comprising several waveguides arranged in parallel, and each one facing another waveguide, each of which being called another waveguide forming a resonator and constituting a region, called the active region, in contact with the dielectric medium, said steps a), b) and c) being implemented for each of said waveguides.

* * * * *